United States Patent
Bouwkamp

(10) Patent No.: US 7,121,574 B2
(45) Date of Patent: Oct. 17, 2006

(54) PIN BOX ASSEMBLY HAVING INTERCHANGEABLE HITCH COUPLERS

(75) Inventor: Philip M. Bouwkamp, Bristol, IN (US)

(73) Assignee: Leland Engineering, Inc., White Pigeon, MI (US)

( * ) Notice: Subject to any disclaimer, the term of this patent is extended or adjusted under 35 U.S.C. 154(b) by 54 days.

(21) Appl. No.: 10/846,107

(22) Filed: May 14, 2004

(65) Prior Publication Data

US 2005/0253361 A1    Nov. 17, 2005

(51) Int. Cl.
*B60D 1/58* (2006.01)
*B60D 1/07* (2006.01)
*B60D 1/60* (2006.01)

(52) U.S. Cl. ............... 280/441.2; 280/416.1; 280/417.1; 280/425.2; 280/496; 280/507

(58) Field of Classification Search ............ 280/441.2, 280/416.1, 417.1, 425.2, 496, 507
See application file for complete search history.

(56) References Cited

U.S. PATENT DOCUMENTS

| | | | | |
|---|---|---|---|---|
| 1,408,057 A | * | 2/1922 | Zimmer | 280/496 |
| 2,449,947 A | * | 9/1948 | Meadows | 414/484 |
| 4,119,328 A | * | 10/1978 | Rhodes | 280/416.1 |
| 4,261,594 A | * | 4/1981 | Corbett et al. | 280/495 |
| 4,704,062 A | * | 11/1987 | Hale | 414/494 |
| 4,776,607 A | * | 10/1988 | Richter et al. | 280/507 |
| 4,832,358 A | * | 5/1989 | Bull | 280/418.1 |
| 5,324,061 A | * | 6/1994 | Lay | 280/417.1 |
| 5,575,491 A | * | 11/1996 | Fenton | 280/417.1 |
| 5,797,614 A | * | 8/1998 | Hord et al. | 280/417.1 |
| 6,109,640 A | * | 8/2000 | Allen et al. | 280/417.1 |
| 6,234,509 B1 | * | 5/2001 | Lara | 280/425.2 |
| 6,474,673 B1 | * | 11/2002 | Biggins | 280/417.1 |

FOREIGN PATENT DOCUMENTS

| | | | | |
|---|---|---|---|---|
| GB | | 2068865 A | * | 8/1981 |
| GB | | 2218391 A | * | 11/1989 |

* cited by examiner

*Primary Examiner*—Lesley D. Morris
*Assistant Examiner*—Marlon Arce-Diaz
(74) *Attorney, Agent, or Firm*—Young & Basile, P.C.

(57) ABSTRACT

A pin box for connecting a trailer to a tow vehicle includes a hollow receiver tube attached to a pair of support beams positioned on opposite sides of the receiver tube. A forward mounting bracket for attaching the pin box to a frame of the trailer is disposed between the two support beams. The mounting bracket is fixedly attached to both support beams. A second mounting bracket is attached to the ends of the support beams opposite the receiver tube. The pin box also includes a hitch connector that is slideably engageable with the receiver tube. The hitch connector may be positioned within the receiver tube at a plurality of discrete predetermined locations. An attaching means is provided for securing the hitch connector to the receiver tube at each of the predetermined locations. The hitch connector may be configured to include a king pin connector or a gooseneck connector. Differently configured hitch connectors may be interchangeably connected to the receiver tube.

51 Claims, 7 Drawing Sheets

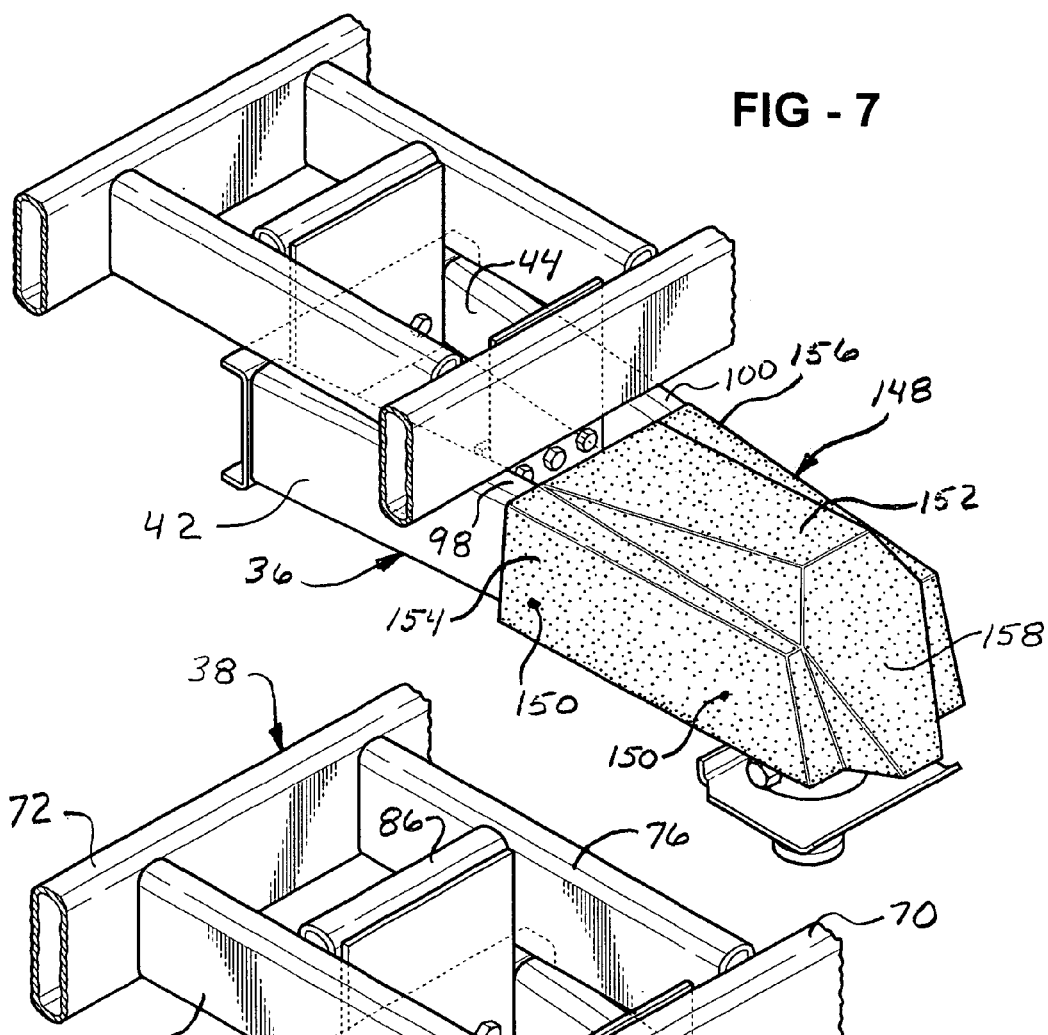

PIN BOX ASSEMBLY HAVING INTERCHANGEABLE HITCH COUPLERS

FIELD OF THE INVENTION

The present invention relates in trailer hitches, and more particularly, to a pin box assembly having interchangeable king pin and gooseneck couplers for attaching a trailer to a tow vehicle.

BACKGROUND OF THE INVENTION

Various hitches and hitch connectors have been previously devised for attaching a trailer to a tow vehicle, such as a receiver type hitch, a $5^{th}$ wheel hitch, and a gooseneck hitch. Receiver type hitches are positioned at the rear of the tow vehicle and typically attach to either the vehicle's bumper or frame. A hitch attached to the vehicle's frame generally has a higher load carrying capacity than a hitch attached to the tow vehicle's bumper. Receiver type hitches include a mechanism for releasably attaching a ball connector to the hitch. This enables differently sized ball connectors to be used interchangeably with the same hitch. The trailer includes an appropriately configured coupler sized to match the size of the ball connector attached to the hitch. The trailer can be releasably attached to the tow vehicle by properly engaging the coupler with the ball connector connected to the hitch.

For towing large heavy trailers a different hitching mechanism may be needed for stable and safe towing. A wide variety of different hitching mechanism for towing heavy loads have been devised. Two such hitches are commonly known as a gooseneck hitch and a $5^{th}$ wheel hitch. They are typically used for towing relatively large trailers, such as a recreational trailer, horse trailer, utility trailer, and the like. A typical $5^{th}$ wheel setup a pin box suitably attached to an underside surface of the trailer. Attached to pin box is a hitch connector commonly known a king pin connector. The pin box is generally cantilevered from a front end of the trailer. This is done to provide sufficient clearance between the tow vehicle and the trailer, particularly when negotiating turns.

A wide variety of vehicle types may be used as the tow vehicle, including a conventional pick-up truck, flatbed truck, tractor truck, or the like. In the case of a pickup truck, the hitch is generally attached to a bed of the vehicle. It is generally desirable to position the hitch either over or slightly forward of a rear axle of the tow vehicle. This provides for more stable towing of the trailer than if the hitch were positioned behind the rear axle.

A gooseneck hitch setup is similar in some respects to a $5^{th}$ wheel. The gooseneck hitch is generally positioned on the tow vehicle at substantially the same location as a $5^{th}$ wheel hitch. The gooseneck hitch itself, however, differs significantly from a $5^{th}$ wheel hitch. A gooseneck hitch typically consists of a ball hitch suitably attached to the tow vehicle. In the case of a pickup truck, the ball hitch is generally attached to the floor of the bed. The gooseneck ball hitch is typically positioned lower on the tow vehicle than a $5^{th}$ wheel hitch. The gooseneck connector attached to the pin box on the trailer includes a suitably configured connector affixed to the end of the gooseneck. The gooseneck connector can be releasably engaged with the ball hitch on the tow vehicle.

Generally speaking, a trailer having a king pin connector can only be connected to a tow vehicle having a $5^{th}$ wheel hitch, and trailers incorporating a gooseneck hitch can only be connected to a tow vehicle that has an appropriately configured ball hitch. This limitation often creates problems in situations where it is desirable to use the same vehicle to tow multiple trailers incorporating different hitch arrangements. For example, if the tow vehicle has a $5^{th}$ wheel hitch and the trailer to be towed has a gooseneck connector, the user would be required to proceed with the time consuming task of removing and replacing the $5^{th}$ wheel hitch with a gooseneck ball hitch. Not only is this process time consuming, but it also results in the added expense of having two different types of hitches on hand.

In an attempt to overcome some of the problems associated with having multiple trailers utilizing different hitching devices, various adapters have been-previously devised. The majority of the adapters convert a king pin connector to a gooseneck connector. The adapter is typically configured to attach directly to the trailer's existing pin box. Such an arrangement may, however, compromise the structural integrity of the pin box since the pin box may not have been designed to carry the additional mechanical load that may result from using the gooseneck adapter. The additional load is due in large part to the increased torsional moment applied to the pin box as a result of increasing the distance between the pin box and the hitch connector. Because of these and other limitations of existing hitch mechanisms, it is desirable to develop a pin box assembly that will allow various types of hitch connectors, such as a gooseneck connector and a king pin connector, to be used interchangeably with the same pin box.

SUMMARY OF THE INVENTION

In accordance with the present invention, a preferred embodiment of a pin box includes a hollow receiver tube attached to a pair of support beams positioned on opposite sides of the receiver tube. A forward mounting bracket for attaching the pin box to a frame of the trailer is disposed between the two support beams. The mounting bracket is fixedly attached to both support beams. A second mounting bracket is attached to the ends of the support beams opposite the receiver tube. A further aspect of the present invention provides a hitch connector that is slideably engageable with the receiver tube. The hitch connector may be positioned within the receiver tube at a plurality of discrete predetermined locations. An attaching means is provided for securing the hitch connector to the receiver tube at each of the predetermined locations. The hitch connector may be configured to include a king pin connector or a gooseneck connector. Differently configured hitch connectors may be interchangeably connected to the receiver tube. The pin box may further include a gusset having one edge attached to the support beam and a second edge attached to an outer periphery of the receiver tube. The pin box may also include a support plate attached to each of the support beams. The support bracket includes a recessed edge that is engageable with the outer periphery of the receiver tube. The receiver tube may be securely attached to the support plate. For additional support, a support gusset may also be attached between the support plate and the outer periphery of the receiver tube. Additional advantages and features of the present invention will become apparent from the following description and appended claims, taken in conjunction with the accompanying drawings.

BRIEF DESCRIPTION OF THE DRAWINGS

The present invention will become more fully understood from the detailed description and the accompanying drawings, wherein:

FIG. 7 is a perspective view of pin box cover employed with the pin box assembly of the present invention;

FIG. 8 is a top perspective view of yet another alternate embodiment of the pin box assembly of the present invention shown attached to the frame of the trailer;

DETAILED DESCRIPTION OF THE PREFERRED EMBODIMENTS

The following description of the preferred embodiments is merely exemplary in nature and is in no way intended to limit the invention, its application, or uses.

Figure 1:
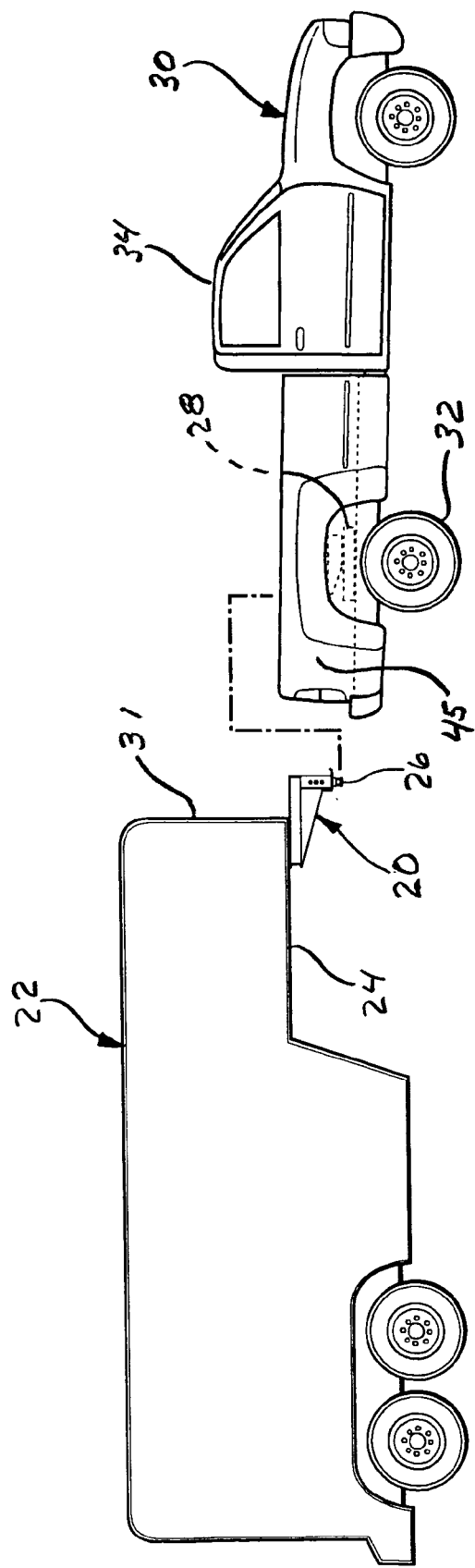
FIG. 1 is a side elevational view of a trailer employing a preferred embodiment pin box assembly of the present invention, the trailer being shown detached from a tow vehicle.

Referring to FIG. 1, a hitch assembly 20 of the present invention is shown attached to a trailer 22. Pin box 20 is affixed to an underside surface 24 of trailer 22. Hitch connector 20 may include one or more interchangeable connecting means 26, which may include a king pin connector for use with a 5$^{th}$ wheel hitch and a goose neck connector. This aspect of the invention will be discussed in more detail subsequently.

Hitch assembly 20 may be used with a variety of conventional hitching mechanisms, including 5$^{th}$ wheels and gooseneck hitches. A typical 5$^{th}$ wheel hitch 28 is shown attached to a tow vehicle 30. A conventional gooseneck hitch (not shown) may be attached in a similar manner and location as a 5$^{th}$ wheel hitch. To provide stable and safe towing of trailer 22, hitch 28 is preferably attached to tow vehicle 30 either directly over or slightly in front of the rear wheels 32 of the tow vehicle.

Trailer 22 may be connected to tow vehicle 30 for towing by engaging connecting means 26 with hitch 28 attached to tow vehicle 30. As can be seen in FIG. 1, hitch assembly 20 is preferably cantilevered from a forward end 31 of trailer 22 to provide sufficient clearance between a cab 34 of tow vehicle 30 and the forward end 31 of trailer 22 so as to prevent the trailer from contacting the tow vehicle, particularly when negotiating turns.

Figure 2:
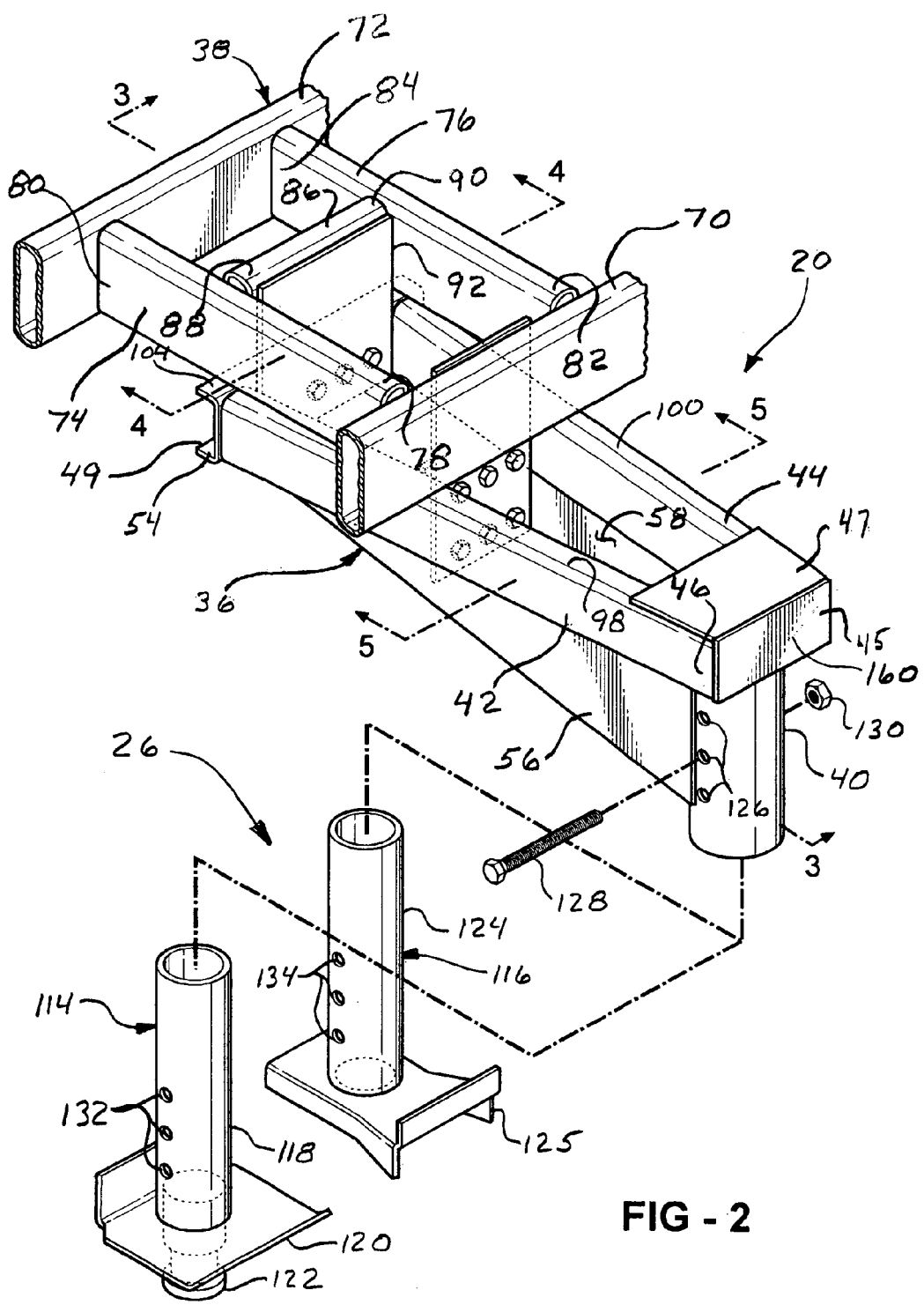
FIG. 2 is a top perspective view of a preferred embodiment pin box of the present invention shown attached to a frame of the trailer.

Referring to FIG. 2, hitch connector 20 includes a pin box 36 that may be attached to a frame 38 of trailer 22. Pin box 36 includes a cylindrically shaped receiver tube 40 for receiving and attaching the connecting means 26 to pin box 36. Receiver tube 40 is preferably oriented substantially vertical when pin box 36 is attached to frame 38 of trailer 22. It shall be appreciated, however, that other angular orientations may also be used. For example, receiver tube 40 may have a slight backward incline from the bottom of the tube to the top of the tube.

Figure 10:
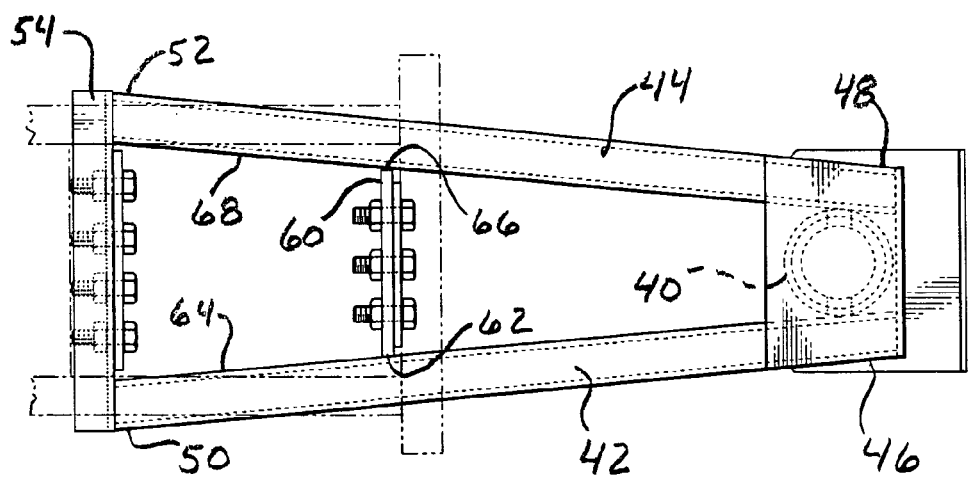
FIG. 10 is a top elevational view of the pin box shown in FIG. 2.

Referring also to FIG. 10, extending on a tangent from an upper end of receiver tube 40 is a right support beam 42 and a left support beam 44. The two beams 42, 44 are positioned on opposite sides of receiver tube 40. The longitudinal axis of the beams 42, 44 are preferably aligned substantially perpendicular to a longitudinal axis of receiver tube 40. A forward end 46 of beam 42 and a forward end 48 of beam 44 may be affixed to receiver tube 40 using any suitable means, such as welding. The length of beams 42, 44 may vary depending on the requirements of the particular application. In certain instances, it may be possible for the beams 42, 44 to have a length that is less than the distance between the center of hitch 28 and an inner surface of bed sidewall 45 of tow vehicle 30. Such a configuration is particularly desirable to prevent an aft end 49 of pin box 36 from contacting the bed of the tow vehicle 30, especially when negotiating very tight turns.

A pair of reinforcing plates 45 and 47 may attached to support beams 42 and 44 to provide additional strength for pin box 36. Reinforcing plate 45 is attached, preferably by welding, to the forward end 46 of support beam 42 and the forward end of support beam 44. Reinforcing plate 47 has one end attached to an upper edge of support beam 42 and a second end attached to support beam 44.

Beams 42,44 may be constructed from any suitable material having sufficient structural strength to withstand the mechanical loads that the beams may be subjected to while the trailer is being towed. Beams 42,44 preferably have a hollow tubular shape to minimize weight while maintaining sufficient structural strength. Although the beams 42,44 are depicted as having a rectangular shape, it shall be appreciated that other shapes may also be used.

As best seen in FIG. 10, the distance between an aft end 50 of beam 42 and an aft end 52 of beam 44 is greater than the distance between forward ends 46 and 48, such that the two support beams generally form a "V" shape when viewed from either above or below. Increasing the distance between the aft ends 50 and 52 of beams 42 and 44, respectively, enables the pin box to better resist torsional loads.

A cross-member 54 is fixedly attached to the aft ends 50 and 52 of beams 42 and 44 respectively, preferably by welding. Cross-member 54 provides an attachment point for connecting pin box 36 to frame 38 of trailer 22. The cross-member 54 is preferably constructed as a C-channel from a heavy gage sheet metal, although other materials and thicknesses may also be used. It shall also be appreciated that cross-member 54 may also have a hollow tubular construction. Such a configuration may require inserts to be appropriately positioned within cross-member 54 to provide additional reinforcement for attaching pin box 36 to frame 38. Alternatively, the tubular cross-member 54 may have one or more access openings provided in an aft surface of the cross-member to allow access to the attaching means used to connect pin box 36 to frame 38.

A pair of plate-like triangular shaped gussets 56 and 58 provide additional support for receiver tube 40. Gussets 56,58 extend between the right and left support beams 42,44 and the receiver tube 40. One edge of gusset 56 adjoins a lower edge surface of the right support beam 42 and an adjacent edge adjoins receiver tube 40. Gusset 56 is preferably attached to support beam 42 and receiver tube 40 by welding, although other attachment methods may be used with equally satisfactory results. Likewise, one edge of gusset 58 adjoins a lower edge surface of the left support beam 44 and an adjacent edge adjoins receiver tube 40. Gusset 58 may likewise be attached to support beam 42 and receiver tube 40 by welding or another suitable method.

Figure 3:
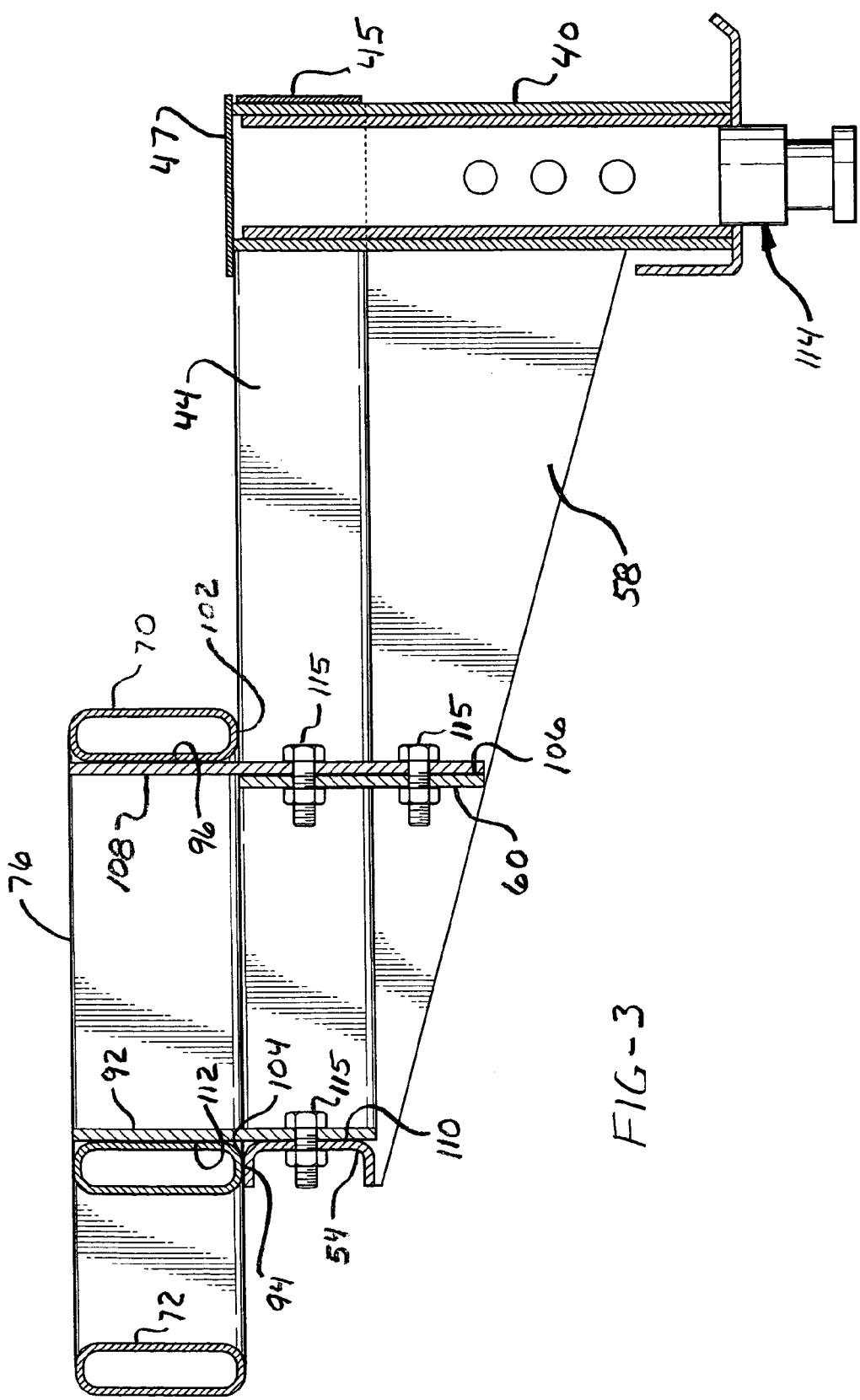
FIG. 3 is a fragmentary cross-sectional view of the pin box assembly and trailer frame shown in FIG. 2 taken along section line 3—3.
Figure 4:
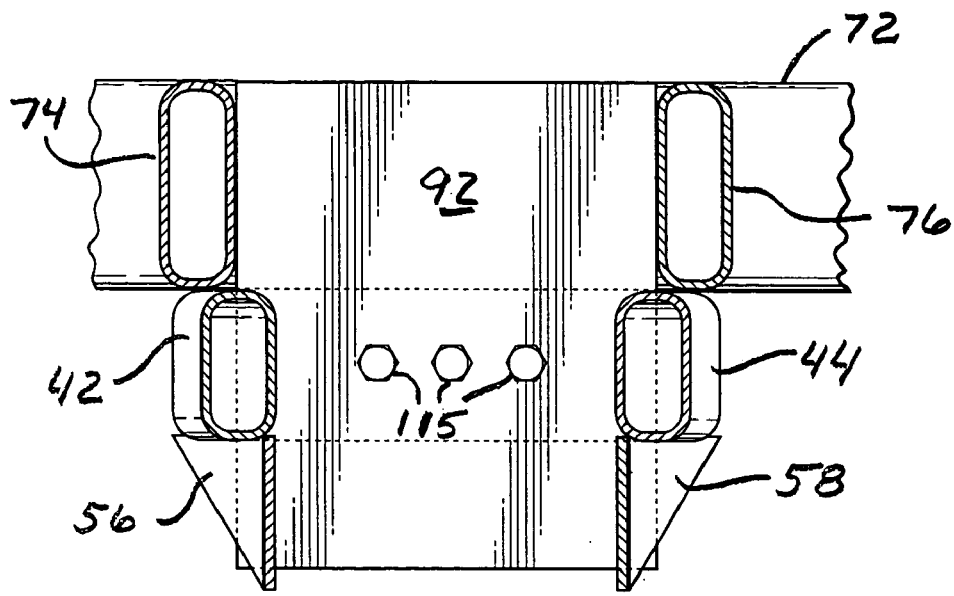
FIG. 4 is a fragmentary cross-sectional view of the pin box assembly and trailer frame shown in FIG. 2 taken along section line 4—4.
Figure 5:
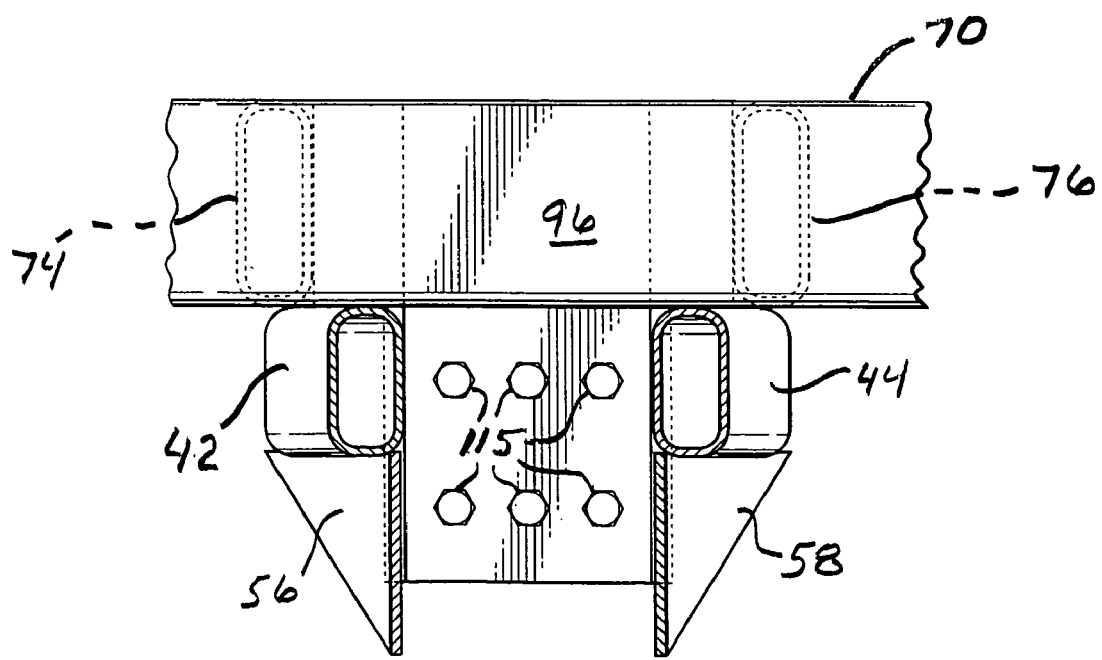
FIG. 5 is a fragmentary cross-sectional view of the pin box assembly and trailer frame shown in FIG. 2 taken along section line 5—5.

Referring to FIGS. 3 and 10, a forward mounting bracket 60 extends between the right support beam 42 and left support beam 44. The mounting bracket 60 is aligned substantially perpendicular to the longitudinal axis of pin box 36. One edge 62 of mounting bracket 60 is fixedly attached to an inside surface 64 of right support beam 42 and an opposite edge 66 is fixedly attached to an inside surface 68 of left support beam 44. Mounting bracket 60 may be fixedly attached to the right and left support beams 42,44 using any suitable method, such as welding.

Pin box 36 may be attached to the frame 38 of trailer 22 using forward mounting bracket 60 and aft mounting bracket 54. To ensure that pin box 36 is securely attached to trailer 22, it is necessary that trailer frame 38 be properly configured. A relevant section of a suitably configured trailer frame is shown in FIG. 2. Frame 38 preferably includes a forward frame rail 70 and an aft frame rail 72. The two frame rails 70,72 are preferably aligned substantially perpendicular to a longitudinal axis of trailer 22. Frame rail 70 is preferably positioned at or near the forward end 31 of trailer 22. Frame rail 72 is displaced away from and positioned aft of forward frame rail 70. The two frame rails 70,72 are preferably aligned substantially parallel to one another.

A mounting point for connecting the rear mounting bracket 54 of pin box 36 to frame 38 is formed by attaching a pair of frame cross-members 74 and 76 to forward frame rail 70 and aft frame rail 72. The two cross-members 74,76 extend between forward frame rail 70 and aft frame rail 72. The two cross-members 74,76 are spaced apart from one another and preferably aligned substantially perpendicular to the forward and aft frame rails 70 and 72. A forward end 78 of cross-member 74 is fixedly attached to forward frame rail 70, and an aft end 80 of cross-member 74 is fixedly attached to aft frame rail 72. Similarly, a forward end 82 of cross-member 76 is fixedly attached to forward frame rail 70 and an aft end 84 of cross-member 76 is fixedly attached to frame rail 72. Cross-members 74 and 76 are preferably attached to forward and aft frame rails by welding. Forward frame rail 70, aft frame rail 72, and cross-members 74 and 76 together form a generally rectangular shaped structure.

Frame 38 further includes a generally rectangular shaped tubular cross-member 86 positioned between and substantially parallel to forward frame rail 70 and aft frame rail 72. Cross-member 86 extends between cross-members 74 and 76, and has one end 88 fixedly attached to cross-member 74 and an opposite end 90 fixedly attached to cross-member 76. Cross-member 86 is preferably attached to cross-members 74 and 76 by welding, although other suitable attaching means may also be used.

A plate-like mounting plate 92 for attaching pin box 36 to frame 38 is suitably affixed, such as by welding, to cross-member 90. Mounting plate 92 extends far enough below a bottom edge 94 of cross-member 86 to enable the aft mounting bracket 54 of pin box 36 to be connected to the mounting plate 92.

Frame 38 also includes a forward mounting plate 96 suitably attached to forward frame rail 70. Mounting plate 96 extends far enough below a bottom edge 102 of forward frame rail 70 to enable the forward mounting bracket 60 of pin box 36 to be connected to the mounting plate.

Pin box 36 is preferably removably attached to frame 38 of trailer 22. Referring to FIGS. 2–5, pin box 36 can be attached to frame 38 of trailer 22 by positioning pin box 36 relative to trailer frame 38 such that upper edges 98 and 100 of support beams 42 and 44, respectively, are either contacting or in close proximity with a lower edge of forward frame rail 70, and an upper edge 104 of aft mounting bracket 54 is either contacting or in close proximity with the lower edge 94 of cross-member 86. Additionally, a forward surface 106 of pin box mounting bracket 60 adjoins an aft surface 108 of forward mounting bracket 96 and a forward surface 110 of aft pin box mounting bracket 54 adjoins an aft surface 112 of aft mounting bracket 92. Forward mounting bracket 60 may be secured to forward mounting plate 108 using one or more bolts 115. Similarly aft mounting bracket 54 may be secured to aft mounting plate 92 using one or more bolts 115. In order to provide a secure connection between mounting plate 92 and mounting bracket 54 as well as between mounting plate 96 and mounting bracket 60, it is preferable that a distance between the aft surface 108 of mounting plate 96 and an aft surface 110 of aft mounting plate 92 be substantially the same as a distance between forward surface 106 of mounting bracket 60 and forward surface 110 of mounting bracket 54. In instances where it is not desirable or necessary that pin box 36 be readily removable from frame 38, forward mounting bracket 60 may be attached to forward mounting plate 108 and aft mounting bracket 54 may be attached to aft mounting plate 92 by means other than bolting, such as welding.

An advantage of the present invention is that it allows a variety of connectors to be interchangeably attached to pin box 36. Two such connectors are illustrated in FIG. 2, and include a king pin connector 114 and a gooseneck connector 116. King pin connector 114 includes a cylindrically shaped support tube 118 that is engageable with receiver tube 40 of pin box 36. Support tube 118 preferably has an outer diameter that is only slightly smaller than an inside diameter of receiver tube 40. Affixed to one end of support tube 118 is a skid plate 120. A king pin 122 may be securely attached to the same end of support tube 118 as skid plate 120. Skid plate 120 operates to transfer the tongue weight of the trailer to hitch 28 when trailer 22 is connected to tow vehicle 30.

Receiver tube 40 includes one or more pairs of apertures 126 positioned along the length of the receiver tube 40. Each aperture of a pair of apertures is positioned on an opposite side of receiver tube 40 such that a longitudinal axis of the two apertures substantially coincide. Each aperture pair is appropriately sized for receiving a bolt 128 used for attaching hitch connectors 26 to receiver tube 40. Bolt 128 may be secured to receiver tube 40 using a nut 130.

Support tube 118 of king pin connector 114 includes one or more pairs of apertures 132 positioned along the length of support tube 118. Each aperture of a given pair is positioned on an opposite side of support tube 118 such that a longitudinal axis of the pair substantially coincide. Each aperture pair is appropriately sized for receiving bolt 128. King pin connector 114 may be attached to pin box 36 by inserting support tube 118 into receiver tube 40. The multiple pairs of apertures 132 and 126 in the support tube 118 and receiver tube 40, respectively, enable a distance between king pin 122 and the underside 24 of trailer 22 to be varied in order for trailer 22 to be positioned at a desired attitude when attached to tow vehicle 30. King pin connector 118 can be attached to receiver tube 40 by aligning a pair of apertures 132 in support tube 118 with a corresponding pair of apertures 126 in receiver tube 40 that will provide the desired distance between the underside 24 of trailer 22 and king pin 122. Support tube 118 may be secured to receiver tube 40 by inserting bolt 128 simultaneously through apertures 132 and 126. Bolt 128 may be secured to receiver tube 40 using nut 130.

Gooseneck connector 116 includes a cylindrically shaped support tube 124 that is similar to support tube 118 of king pin connector 114. Support tube 124 preferably has an outer diameter that is only slightly smaller than an inside diameter of receiver tube 40. Fixedly attached to one end of support tube 124 is an attaching means 125 for connecting the gooseneck connector 116 to a gooseneck hitch attached to tow vehicle 30.

Similar to support tube 118 of king pin connector 114, support tube 124 of gooseneck connector 116 also includes one or more pairs of apertures 134 positioned along the length of the support tube 124. Each aperture of a given pair is positioned on an opposite side of support tube 124 such that a longitudinal axis of the two apertures substantially coincide. Each aperture pair is appropriately sized for receiving bolt 128. Gooseneck connector 116 may be attached to pin box 36 by inserting support tube 124 into receiver tube 40. The multiple pairs of apertures 134 and 126 in the support tube 124 and receiver tube 40, respectively, enable a distance between attaching means 126 and the underside 24 of trailer 22 to be varied in order for trailer 22 to be positioned at a desired attitude when attached to tow vehicle 30. Gooseneck hitch 116 can be attached to receiver tube 40 by aligning a pair of apertures 134 in support tube 124 with a corresponding pair of apertures 126 in receiver tube 40 that will provide the desired distance between the underside 24 of trailer 22 and attaching means 125. The support tube 124 may be secured to receiver tube 40 by inserting bolt 128 through the appropriate apertures 126 and 134. Bolt 118 may be secured to receiver tube 40 using nut 130.

Figure 6:
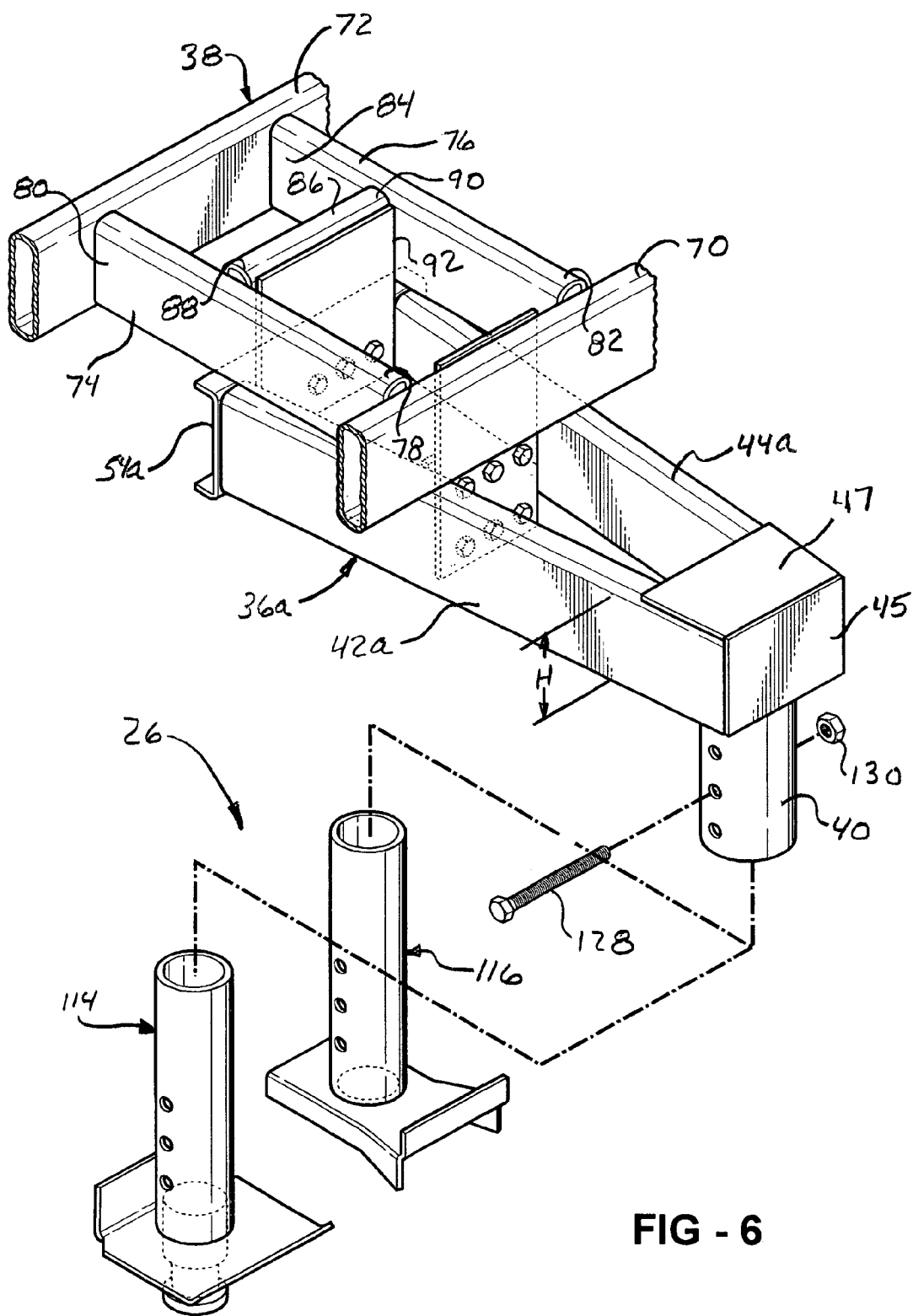
FIG. 6 is a perspective view of an alternate embodiment of the pin box assembly without support gussets.

Referring to FIG. 6, a pin box 36a may also be constructed without gussets 56 and 58. Pin box 36a in large part has the same configuration as pin box 36. Aside from eliminating gussets 56 and 58, the only difference is that a height "H" of support beams 42a and 44a and mounting bracket 54a are larger than a corresponding height of support beams 42 and 44 and mounting bracket 54 of pin box 36. To facilitate attaching pin box 36a to frame 38, it may be desirable to also increase the distance mounting plates 96 and 92 extend below lower edge 102 of forward frame rail 70 and lower edge 94 of cross-member 90, respectively.

Figure 9:
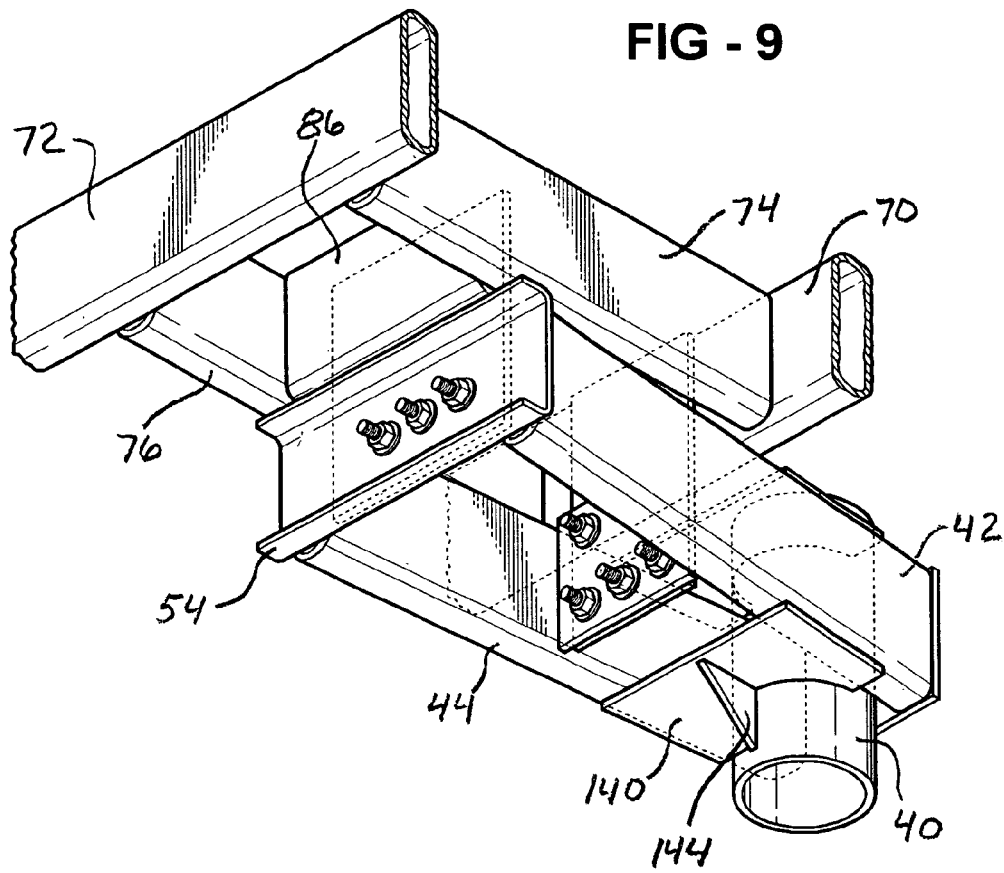
FIG. 9 is a bottom perspective view of the pin box assembly shown in FIG. 8.

Referring to FIGS. 8 and 9, there is shown an alternate method of attaching receiver tube 40 to support beams 42 and 44. An upper support plate 138 is fixedly attached, preferably by welding, to upper edge 98 of support beam 42 and upper edge 100 of support beam 44. A semi-circular notch is provided along one edge of support plate 138 for engaging an outer periphery surface of receiver tube 40. A similarly configured lower support plate 140 is fixedly attached, preferably by welding, to a lower edge 142 of right support beam 42 and a lower edge 144 of left support beam 44. Lower support plate 140 also includes a semi-circular notch that engages the outer periphery of receiver tube 40. Receiver tube may be fixedly attached to upper and lower support plates 138 and 140, respectively, using any suitable means, such as welding. For additional support, a triangular shaped gusset 146 may be connected between the lower support plate 140 and receiver tube 40. Gusset 146 preferably extends radially outward from receiver tube 40 and is aligned substantially parallel to the longitudinal axis of receiver tube 40. To provide the pin box with additional strength, a reinforcing plate 141 may be attached, preferably by welding, to the forward end 46 of support beam 42 and the forward end 48 of support beam 44.

Referring to FIG. 7, the pin box of the present invention may also include a cover 148 for protecting an exposed forward portion of pin box 36 from environmental effects, such as rain and, as well as providing a more aesthetically pleasing shape. Cover 148 includes a top panel 152, a first side panel 154 adjoining the top panel 152, a second side panel 156 positioned opposite the first side panel 154 and adjoining top panel 152, and a front panel 158 adjoining top panel 152, first side panel 156, and second side panel 158. When cover 148 is attached to pin box 36, an inside surface of top panel 152 adjoins upper edges 98 and 100 of support beams 42 and 44, respectively, first side panel 154 is positioned adjacent right support beam 42, second side panel 156 is positioned adjacent left support beam 44, and front panel 158 is positioned adjacent a leading edge surface 160 (see FIG. 2) of pin box 36.

Cover 148 may be made from any of a variety of materials, including but not limited to steel, aluminum, plastics, composites, and the like. Cover 148 preferably extends from the leading edge 160 of pin box 36 aft to forward frame rail 70 of trailer 22, and substantially covers a portion of support beams 42 and 44 extending beyond the forward end 31 of trailer 22. Cover 148 may be suitably attached to support beams 42 and 44 using screws 150, bolts, rivets, and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pin box assembly for connecting a trailer to a tow vehicle, the pin box comprising:
   a hollow receiver tube;
   a hitch connector slideably engageable with the receiver tube, the hitch connector selectably positionable at a plurality of predetermined locations within the receiver tube;
   means for securing the hitch connector at each predetermined location within the receiver tube;
   a first support beam attached to an outer lateral peripheral surface of the receiver tube, the support beam projecting outwardly from the receiver tube; and
   a second support beam attached to the outer lateral peripheral surface of the receiver tube and projecting outwardly from the receiver tube in generally the same direction as the first support tube, wherein the receiver tube is disposed between the first and second support beams.

2. The pin box of claim 1 further comprising a gusset having a first edge attached to the first support beam and a second edge attached to the outer periphery of the receiver tube.

3. The pin box of claim 1, wherein a longitudinal axis of at least one of the first and second support beams is aligned substantially perpendicular to a longitudinal axis of the receiver tube.

4. The pin box of claim 1, wherein at least one of the first and second support beams has a hollow tubular construction.

5. The pin box of claim 1, wherein at least one of the first and second support beams has a generally rectangular shape.

6. The pin box of claim 1, wherein a longitudinal axis of the first beam and a longitudinal axis of the second beam diverge from one another.

7. The pin box of claim 1, further comprising a mounting bracket for attaching the pin box to a frame of the trailer, the mounting bracket being disposed between the first and second support beams and having one end attached to the first support beam and a second end attached to the second support beam.

8. The pin box of claim 7, wherein the mounting bracket has a substantially planar rectangular shape.

9. The pin box of claim 7, wherein the mounting bracket has a generally "C" shaped cross-sectional shape.

10. The pin box of claim 9, wherein the mounting bracket is attached to an end of the first support beam and an end of the second support beam opposite the end of the first beam and the end of the second beam to which the receiver tube is attached.

11. The pin box of claim 1 further comprising a cover having a top panel, a front panel adjoining the top panel, a first side panel adjoining the top panel and the front panel, and a second side panel positioned opposite the first side panel and adjoining the top panel and the front panel, the cover being positionable with respect to the pin box such that the first side panel is juxtaposed the first support beam and the second side panel is juxtaposed the second support beam.

12. The pin box of claim 11, wherein the first side panel is attachable to the first support beam and the second side panel is attachable to the second support beam.

13. The pin box of claim 11, wherein at least a portion of the top panel is engageable with at least one of a top surface of the first support beam and a top surface of the second support beam.

14. The pin box of claim 11, wherein the front panel is juxtaposed a leading edge of the pin box when the first side panel is placed in juxtaposition with the first support beam and the second side panel is placed in juxtaposition with the second support beam.

15. The pin box of claim 1, wherein the hitch connector comprises a gooseneck connector.

16. The pin box of claim 1, wherein the hitch connector comprises a king pin connector.

17. A pin box assembly for connecting a trailer to a tow vehicle, the pin box comprising:
a hollow receiver tube;
a hitch connector slideably engageable with the receiver tube, the hitch connector selectably positionable at a plurality of predetermined locations within the receiver tube;
means for securing the hitch connector at each predetermined location within the receiver tube;
a first support beam positioned adjacent an outer peripheral surface of the receiver tube and extending laterally away from the receiver tube;
a second support beam positioned adjacent the outer peripheral surface of the receiver tube and extending laterally away from the receiver tube in generally the same direction as the first support tube; and
a support plate attached to the first and second support beams, the support plate having a notch for engaging an outer periphery of the receiver tube, the receiver tube being attached to the support plate.

18. The pin box of claim 17 further comprising a gusset having a first edge attached to the support plate and a second edge attached to the outer periphery of the receiver tube.

19. The pin box of claim 17, wherein the gusset extends radially from the receiver tube and is aligned substantially parallel to the longitudinal axis of the receiver tube.

20. A pin box assembly comprising:
a receiver tube having an interior surface defining a hollow cavity;
a first support beam having one end attached to an outer lateral peripheral surface of the receiver tube;
a second support beam having one end attached to the outer lateral peripheral surface of the receiver tube opposite the connection between the first support beam and the receiver tube, wherein the receiver tube is disposed between the first and second support beams;
a hitch connector having a support tube engageable with the hollow cavity of the receiver tube, the support tube being selectably positionable at a plurality of predetermined locations within the hollow cavity; and
means for securing the support tube at each predetermined location with the hollow cavity.

21. The pin box of claim 20 further comprising a cover having a top panel, a front panel adjoining the top panel, a first side panel adjoining the top panel and the front panel, and a second side panel positioned opposite the first side panel and adjoining the top panel and the front panel, the cover being positionable with respect to the pin box such that the first side panel is juxtaposed the first support beam and the second side panel is juxtaposed the second support beam.

22. The pin box of claim 21, wherein the first side panel is attachable to the first support beam and the second side panel is attachable to the second support beam.

23. The pin box of claim 21, wherein at least a portion of the top panel is engageable with at least one of a top surface of the first support beam and a top surface of the second support beam.

24. The pin box of claim 21, wherein the front panel is juxtaposed a leading edge of the pin box when the first side panel is placed in juxtaposition with the first support beam and the second side panel is placed in juxtaposition with the second support beam.

25. The pin box assembly of claim 20 further comprising a mounting bracket disposed between the first support beam and the second support beam, the mounting bracket having one end attached to the first support beam and a second end attached to the second support beam.

26. The pin box assembly of claim 20, wherein a longitudinal axis of the first beam and a longitudinal axis of the second beam diverge from one another.

27. The pin box assembly of claim 20 further comprising a substantially planar gusset having first edge attached to the first support beam and a second edge attached to the outer periphery of the receiver tube.

28. The pin box assembly of claim 20, wherein the hitch connector further comprises a skid plate and a king pin attached to one end of the support tube.

29. The pin box assembly of claim 20, wherein the hitch connector further comprises a gooseneck connector attached to one end of the support tube.

30. The pin box assembly of claim 20 further comprising a mounting bracket for connecting the pin box to a frame of a trailer, the mounting bracket being attached to an end of the first support beam and an end of the second support beam.

31. A trailer pin box assembly comprising:
a first support beam;
a second support beam positioned adjacent the first support beam;
a receiver tube disposed between the first and second support beams;
a support plate having a first end attached to the first support beam and a second end attached to the second support beam, the support plate having an edge defining a notched region for engaging an outer periphery of the receiver tube; and a hitch connector telescopically engageable with the receiver tube, the hitch connector capable of being secured within the receiver tube at a plurality of discrete selectable locations.

32. The pin box of claim 31 further comprising a cover having a top panel, a front panel adjoining the top panel, a first side panel adjoining the top panel and the front panel, and a second side panel positioned opposite the first side panel and adjoining the top panel and the front panel, the cover being positionable with respect to the pin box such that the first side panel is juxtaposed the first support beam and the second side panel is juxtaposed the second support beam.

33. The pin box of claim 32, wherein the first side panel is attachable to the first support beam and the second side panel is attachable to the second support beam.

34. The pin box of claim 32, wherein at least a portion of the top panel is engageable with at least one of a top surface of the first support beam and a top surface of the second support beam.

35. The pin box of claim 32, wherein the front panel juxtaposed a leading edge of the pin box when the first side panel is placed in juxtaposition with the first support beam and the second side panel is placed in juxtaposition with the second support beam.

36. The pin box of claim 31 further comprising a gusset having one edge attached to the support plate and another edge attached to the outer periphery of the receiver tube.

37. The pin box of claim 31 further comprising a mounting bracket for attaching the pin box to a frame of the trailer, the mounting bracket being disposed between the first and second support beams and having one end attached to the first support beam and a second end attached to the second support beam.

38. The pin box of claim 31 further comprising a mounting bracket for attaching the pin box to a frame of the trailer, the mounting bracket being attached to an end of the first support beam and an end of the second support beam.

39. The pin box assembly of claim 31, wherein a longitudinal axis of the first support beam and a longitudinal axis of the second support beam diverge.

40. The pin box assembly of claim 31, wherein the hitch connector comprises a skid plate and a king pin attached to a common end of the support tube.

41. The pin box assembly of claim 31, wherein the hitch connector comprises a gooseneck connector attached to one end of the support tube.

42. A trailer hitch assembly for connecting a trailer to a tow vehicle, the hitch assembly comprising:

a trailer frame having a first frame rail;

a pin box attached to the first frame rail, the pin box comprising:

a hollow receiver tube;

a hitch connector slideably engageable with the receiver tube, the hitch connector selectably positionable at a plurality of predetermined locations within the receiver tube; and means for securing the hitch connector at each predetermined location within the receiver tube.

43. The hitch assembly of claim 42, wherein the pin box further comprises:

a first support beam attached to an outer peripheral surface of the receiver tube, the support beam projecting outwardly from the receiver tube, and a second support beam attached to the outer peripheral surface of the receiver tube and projecting outwardly from the receiver tube in generally the same direction as the first support tube.

44. The hitch assembly of claim 43 further comprising:

a pin box mounting bracket disposed between the first and second support beams and having one end attached to the first support beam and a second end attached to the second support beam; and a frame mounting bracket attached to the first frame rail, the frame mounting bracket being attached to the pin box mounting bracket.

45. The hitch assembly of claim 43 further comprising:

a pin box mounting bracket attached to an end of the first support beam and an end of the second support beam; and a frame mounting bracket attached to the first frame rail, the frame mounting bracket being attached to the pin box mounting bracket.

46. The hitch assembly of claim 43 further comprising:

a second frame rail displaced away from the first frame rail;

a first cross-member having a first end attached to the first frame rail and a second end attached to the second frame rail;

a second cross member having a first end attached to the first frame rail and a second end attached to the second frame rail;

a third cross member disposed between the first frame rail and the second frame rail, the third cross-member having a first end attached to the first cross-member and a second end attached to the second cross-member;

a frame mounting bracket attached to the third cross-member; and a pin box mounting bracket attached an end of the first support beam and an end of the second support beam, the pin box mounting bracket being attached to the frame mounting bracket.

47. The hitch assembly of claim 43 further comprising a gusset having a first edge attached to the first support beam and a second edge attached to the outer periphery of the receiver tube.

48. The pin box of claim 43 further comprising a cover having a top panel, a front panel adjoining the top panel, a first side panel adjoining the top panel and the front panel, and a second side panel positioned opposite the first side panel and adjoining the top panel and the front panel, the cover being positionable with respect to the pin box such that the first side panel is juxtaposed the first support beam and the second side panel is juxtaposed the second support beam.

49. The pin box of claim 48, wherein the first side panel is attachable to the first support beam and the second side panel is attachable to the second support beam.

50. The pin box of claim 49, wherein at least a portion of the top panel is engageable with at least one of a top surface of the first support beam and a top surface of the second support beam.

51. The pin box of claim 49, wherein the side panel is juxtaposed to a leading edge of the pin box when the first side panel is placed in juxtaposition with the first support beam and the second side panel is placed in juxtaposition with the second support beam.

* * * * *